United States Patent
Boiocchi et al.

[11] Patent Number: 5,964,266
[45] Date of Patent: Oct. 12, 1999

[54] TIRE FOR MOTOR-VEHICLE WHEELS PROVIDED WITH A TREAD PRODUCING A LOW ROLLING NOISE

[75] Inventors: Maurizio Boiocchi; Gianfranco Colombo, both of Milan, Italy

[73] Assignee: Pirelli Coordinamento Pneumatici, S.p.A., Milan, Italy

[21] Appl. No.: 08/788,784

[22] Filed: Jan. 24, 1997

Related U.S. Application Data

[63] Continuation of application No. 08/251,578, May 31, 1994, abandoned.

[30] Foreign Application Priority Data

May 31, 1993 [IT] Italy .................................. MI93A1119

[51] Int. Cl.⁶ ............................ B60C 11/03; B60C 11/12; B60C 113/00
[52] U.S. Cl. .................................. 152/209.2; 152/209.27; 152/903; 152/DIG. 3
[58] Field of Search ............................ 152/209 R, 209 A, 152/209 D, DIG. 3; D12/146, 147, 148

[56] References Cited

U.S. PATENT DOCUMENTS

| | | | |
|---|---|---|---|
| D. 261,497 | 10/1981 | Baus et al. .............................. | D12/147 |
| 4,057,089 | 11/1977 | Johannsen ........................... | 152/209 R |
| 4,299,264 | 11/1981 | Williams .............................. | 152/209 R |
| 4,424,843 | 1/1984 | Fontaine et al. ..................... | 152/209 R |
| 4,700,762 | 10/1987 | Landers ................................ | 152/209 R |
| 4,936,364 | 6/1990 | Kajiwara et al. . | |
| 4,953,604 | 9/1990 | Shepler et al. . | |
| 5,234,042 | 8/1993 | Kuhr et al. .......................... | 152/209 R |
| 5,287,905 | 2/1994 | Caretta et al. . | |
| 5,423,364 | 6/1995 | Himuro ................................ | 152/209 R |
| 5,526,860 | 6/1996 | Minami ................................ | 152/209 R |

FOREIGN PATENT DOCUMENTS

| | | | |
|---|---|---|---|
| 0457233 | 11/1991 | European Pat. Off. . | |
| 0475929 | 3/1992 | European Pat. Off. . | |
| 565270 | 10/1993 | European Pat. Off. . | |
| 982784 | 6/1951 | France ............................... | 152/209 R |
| M9206716 | 2/1939 | Germany . | |
| 9005029 | 7/1990 | Germany . | |
| G90050304 | 8/1990 | Germany . | |
| M92067166 | 2/1993 | Germany . | |
| 59-63206 | 10/1982 | Japan . | |
| 42508 | 1/1992 | Japan . | |
| 4193608 | 7/1992 | Japan . | |
| 317805 | 11/1992 | Japan ................................ | 152/209 R |
| 4317805 | 11/1992 | Japan . | |
| 6-40215 | 2/1994 | Japan . | |
| 2229974 | 10/1990 | United Kingdom ............... | 152/209 R |
| 2239845 | 7/1991 | United Kingdom ............... | 152/209 D |
| 2250487 | 6/1992 | United Kingdom ............... | 152/209 D |

OTHER PUBLICATIONS

Woods, E.C., Pneumatic Tyre Design, pp. 8–25, 1955.
Toyo advertisement of May 1991.
Continental advertisement of 1990.
Cooper advertisement of Jun. 1991.
Yokohama advertisement. (No Date).
First Dunlop advertisement. (No Date).

(List continued on next page.)

*Primary Examiner*—Steven D. Maki
*Attorney, Agent, or Firm*—Stevens, Davis, Miller & Mosher, L.L.P.

[57] ABSTRACT

A tread for motor-vehicle tires has a raised pattern formed of a plurality of shaped blocks 7 distributed in circumferential rows 3, 4, 5, 6 disposed in parallel and in side by side relation. The number of the shaped blocks 7 arranged in each row gradually increases while moving from the equatorial plane X—X to the axial outer side edges 1a of the tread 1. Thus a gradual increase in the longitudinal stiffness of the shaped blocks 7 is achieved on passing from the side edges 1a of the tread 1 to the equatorial plane X—X, which brings about a reduction in the mobility of said blocks on the road contact patch and lower rolling noise.

18 Claims, 2 Drawing Sheets

OTHER PUBLICATIONS

Copy of a magazine page describing two Dunlop tires cited in First Dunlop advertisement. (No Date).
Bridgestone advertisement. (No Date).
Falken advertisement. (No Date).
Second Dunlop advertisement. (No Date).
Flamingo advertisement. (No Date).
General tire advertisement. (No Date).
Third Dunlop advertisement. (No Date).
Picture of MXT tire from Michelin Catalogue, 1992.
Picture of MAX 380 tire from Uniroyal Catalogue, 1990.

TIRE FOR MOTOR-VEHICLE WHEELS PROVIDED WITH A TREAD PRODUCING A LOW ROLLING NOISE

This application is a continuation of application Ser. No. 08/251,578, filed May 31, 1994 (abandoned).

BACKGROUND OF THE INVENTION

The present invention relates to a tire for motor vehicle wheels having a tread producing a low rolling noise, which comprises a raised pattern formed of a plurality of shaped blocks distributed in parallel circumferential rows bounded by longitudinal grooves extending circumferentially around the tire with each row comprising a given number of shaped blocks separated from each other by respective transverse generally axially expanding cuts.

It is known that tires for road motor vehicles have a plurality of longitudinal grooves and generally axially extending transverse cuts on the tread, which define a plurality of shaped blocks thereon, said blocks being distributed according to a carefully determined specific pattern.

Within the tread pattern in which the longitudinal grooves are positioned the shaped blocks are distributed in several side by side rows. A proper distribution gives the tire the desired features of directional control stability and road holding in relation to the sidewise thrusts directed parallel to the wheel axis. The transverse cuts, in turn, give the tire the desired road traction, that is the capability of efficiently transmitting tangential thrusts parallel to the running direction during speeding up and slowing down of the vehicle. In principle, the traction of the tire tends to become greater as the number of the transverse cuts arranged in the tread increases and the orientation of the cuts themselves approach an orientation which is perpendicular to the running direction.

In addition, the longitudinal grooves and transverse cuts cooperate in performing an efficient draining action of water from the tread pattern area of the tire during running on a wet road bed.

The presence of the transverse cuts and longitudinal grooves however causes the well known effect of noise produced by the rolling tire. One of the main causes of rolling noise has been found to be caused by the continuous succession of impacts of the shaped block corners on the road bed.

Another contributory cause in generating noise is the rubbing that the shaped blocks undergo in contact with the road bed when they enter and leave the ground contact patch. These rubbings are essentially due to the deformations necessarily undergone by the tread, when its outer surface, which in a free state has a convex conformation, inevitably becomes flat against the road bed.

The dynamic actions causing the deformation of the tread between the entry and exit regions to and from the contact patch also give rise to a cyclic variation of the volume of the grooves and cuts defined between the shaped blocks, which brings about a cyclic compressive and decompressive action on the air contained in the grooves and cuts. This phenomena of air compression and decompression assist in the generation of noise produced by the rolling tire.

The known art suggests several expedients for limiting as much as possible the noise produced by a tire rolling.

One expedient which has been adopted for a long time essentially consists of differentiating the longitudinal dimensions, that is those along the circumferential extension, of the single shaped blocks. In other words, the blocks are disposed on the circumferential extension of the tread according to two or more differentiated pitch values distributed in a circumferential succession, usually referred to as "pitch sequence" which is generally carefully laid out so as to achieve the maximum possible avoidance of pattern repetition around the tire circumference. In this manner the pressure waves generated by the impacts and rubbings of the blocks do not take place according to a specific frequency on which most of the acoustic energy generated as a result of rolling would be concentrated. In other words, the acoustic energy is distributed over a wide frequency range, thereby eliminating the troublesome effect of harmonic repetition and noise usually known as "squirrel effect".

For the purpose of distributing the acoustic energy over a greater number of frequencies, it has also been suggested to carry out offsetting, with respect to each other, of the blocks belonging to circumferential rows disposed consecutively in side by side relation. This solution however makes it difficult to drain the water from the center of the contact area towards the outer edges of the tread and therefore makes it necessary to increase the width of the longitudinal grooves for achieving a sufficient draining action.

Another expedient consists in giving the transverse cuts a suitably inclined orientation with respect to tire's axis of rotation. This enables the impacts of the block corners on the road bed to be "smoothed" but, on the other hand, it impairs the road traction of the tire.

A considerable reduction of the noise produced by rolling has been achieved by forming additional narrow cuts usually referred to as "sipes" in the shaped blocks, said sipes acting to increase the elastic deformability of the blocks. This solution too enables the impact of the block on the road bed to be smoothed, thereby causing a reduction of the noise resulting from impacts. However a greater deformability of a block will tend to increase the noise effects resulting from rubbings.

By way of example of the above described state of the art, reference is made to Assignee's prior U.S. Pat. No. 5,287,905 the disclosure of which is hereby incorporated by reference.

SUMMARY OF THE INVENTION

In accordance with the present invention it has been found that by arranging in the circumferential rows close to the equatorial plane (mid-circumferential plane) of the tire or center rows, a smaller number of shaped blocks than is provided in the rows adjacent the axial outer side edges of the tread or shoulder rows, it is possible to achieve an important reduction of the noise produced by rolling of the tire without impairing the traction and direction control features of the present tire and its efficiency in water draining.

In particular, the invention relates to a tire for vehicle wheels, in particular motor vehicle wheels, provided with a tread producing a low rolling noise, characterized in that each of the axially outer rows have a greater number of shaped blocks than the number of shaped blocks present in the axial inner adjacent row, that is the row disposed consecutively in side by side relation therewith towards the equatorial plane of the tread. This construction gives the tread a gradually increasing longitudinal stiffness from the axially outer side edges thereof towards the equatorial plane.

Close to the equatorial plane at least one continuous circumferential rib may be disposed, said rib being defined between two of said longitudinal grooves. Preferably, two of said circumferential ribs are provided and they are symmetrically disposed with respect to the equatorial plane of the tread and mutually separated by a central groove.

According to a further feature of the invention, in each row of said shaped blocks the transverse cuts define an impact angle with the adjacent longitudinal grooves which has a greater width than the impact angle formed with the transverse cuts of the block row disposed consecutively in side by side relation therewith towards the equatorial plane.

In greater detail, the value of the impact angle in the block rows that are closest to the equatorial plane is in the range of 15° to 25°, whereas in the block rows closest to the axial outer side edges of the tread said impact angle is in the range of 70° to 105°.

Advantageously, each of said rows has first transverse cuts each extending consecutively of one of the first transverse cuts belonging to the block row which is disposed adjacent in side by side relation.

Said first cuts consecutively aligned define continuous transverse grooves each extending from the corresponding axial outer side edge of the tread and toward said equatorial plane.

Each of said transverse grooves, starting from the corresponding axial outer side edge has one straight portion substantially perpendicular to the longitudinal grooves, a curved union portion and a second straight portion disposed obliquely relative to said longitudinal grooves.

In addition, at least one of said rows of blocks has second transverse cuts each of them being intermediate between two of said first cuts.

Preferentially, the second cuts are associated with outer shoulder rows, adjacent to the outer side edges of the tread, and inner shoulder rows disposed side by side with the outer shoulder rows towards the equatorial plane.

Each of said second cuts is spaced apart a varying distance from the first cuts contiguous therewith and has a smaller width than the first cuts. In particular, the ratio between the width of the second cuts and that of the first cuts is in the range of 50% to 100%.

It is also provided that the blocks of at least one of said rows should each have at least one transverse slot extending towards said equatorial plane over a portion of lower width than the width of the block itself, as an extension of one of said second cuts. Said transverse slots are preferentially associated with outer center rows disposed consecutively and side by side with the inner shoulder rows towards the equatorial plane of the tread.

Each of said transverse slots extends over about half the width of the respective block.

At least one of said block rows further comprises third cuts extending parallel to said first and second transverse cuts. In greater detail, said third transverse cuts are associated with outer shoulder rows adjacent to the axial outer side edges of the tread.

Advantageously, the longitudinal grooves separating the outer shoulder rows from the block rows contiguous thereto are interrupted in the portions included between each of the third cuts and one of the first and second contiguous cuts.

The third cuts preferentially have a smaller width than said first and second transverse cuts. In greater detail, along the extension of each of said third cuts there is defined an inner portion facing said equatorial plane and having a width lower than 1 mm and an outer portion of greater width than the inner portion.

BRIEF DESCRIPTION OF THE DRAWINGS

Further features and advantages will become more apparent from the detailed description of a preferred embodiment of a tread pattern producing low rolling noise, in particular for motor vehicle tires, according to the present invention, given hereinafter by way of non-limiting example with reference to the accompanying drawings, in which.

DETAILED DESCRIPTION OF THE DRAWINGS

Figure 1:
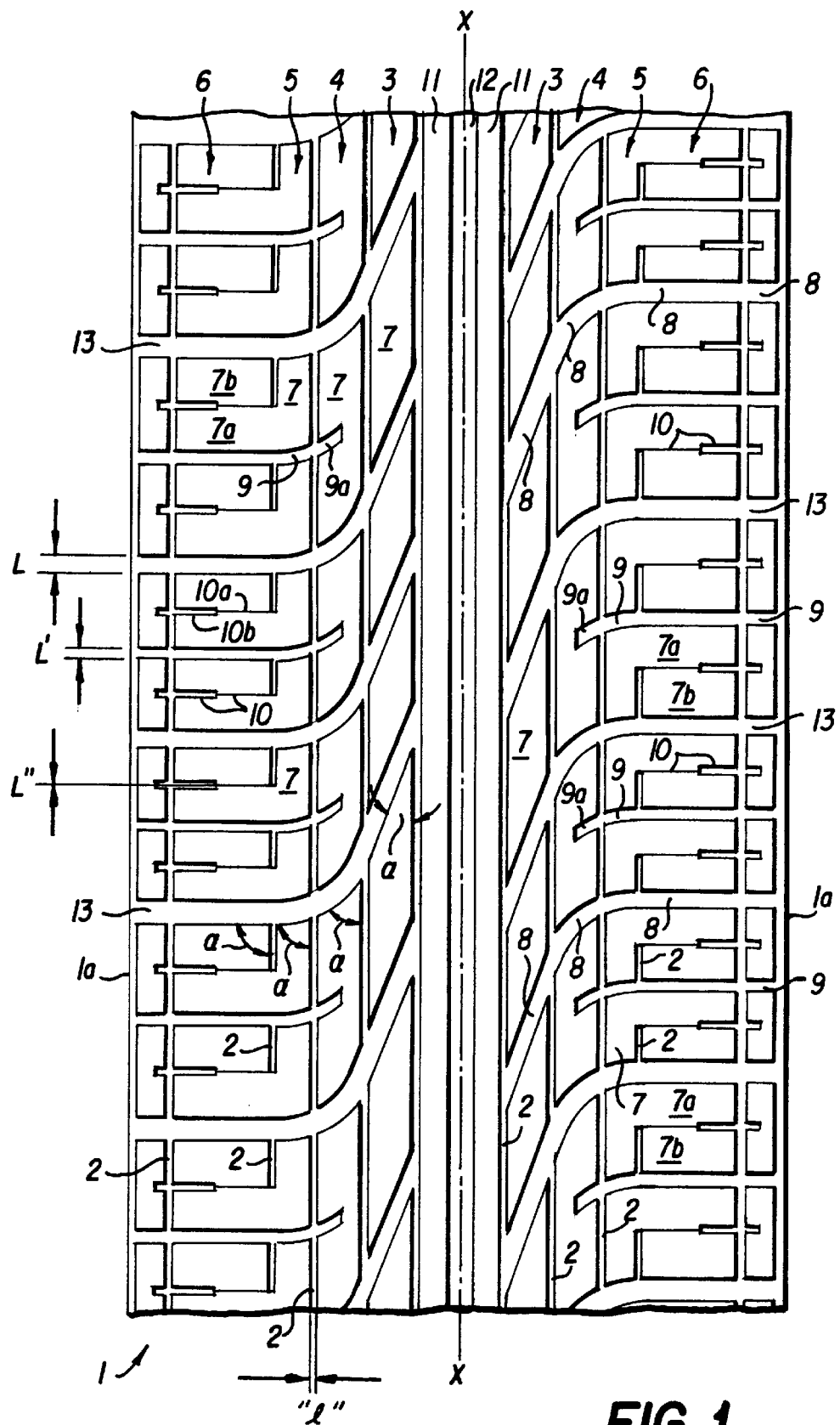
FIG. 1 is a plan view of a tread portion in accordance with the present invention.

Referring to the drawings, a tread producing a low rolling noise in particular for motor vehicle tires in accordance with the present invention is generally identified in FIG. 1 by reference numeral 1. As shown in FIG. 1, the tread has a non-directional tread pattern.

The tread 1 conventionally has a plurality of longitudinal grooves 2, spaced apart a suitable distance from each other and extending in a circumferential direction relative to the tire with which the tread is associated. Such grooves 2 define on the width of the tread 1, a plurality of circumferential rows 3, 4, 5, 6 disposed parallel and in side by side relation and extending circumferentially around the tire, each comprising a predetermined number of shaped blocks 7, 7a, 7b separated from each other by respective transverse cuts suitably oriented relative to the longitudinal grooves 2.

In accordance with the present invention, advantageously in each of the circumferential rows 3, 4, 5, 6 the number of shaped blocks 7, 7a, 7b is greater than the number of blocks present in the adjacent row towards the equatorial plane X—X of the tread 1 (as denoted by line X—X in FIG. 1). In other words, the number of blocks 7, 7a, 7b present in each row 3, 4, 5, 6 gradually increases on passing axially outward from the central area toward either of the side edges 1a of the tread 1.

This construction results in the tread 1 having a longitudinal stiffness which gradually increases from the outer aide edges 1a thereof towards the equatorial plane X—X, for purposes to be later clarified.

The Applicant has observed that this variation in the number of blocks present in adjacent rows produces considerable effects in the finished tire; especially during its use when the number of rows of blocks on each side of the center line of the tire is not lower than 3 and preferably not higher than 5.

The particular embodiment shown is a prototype tire having a P-metric trade identification of 205/50-R-15, and is similar to prior art tires of the same size, e.g. Pirelli P700Z, in all usual respects (carcass structure, hardness of materials, inflation shape and pressure, depth and width of grooves, cuts and sipes, etc.) except for the herein described tread pattern. In the present invention at the equatorial plane X—X of the tread 1, the number of blocks 7 is substantially zero, or, stated another way there is at least one circumferential continuous rib 11 located along plane X—X, that rib being defined between two of said longitudinal grooves 2. Thus, one could consider continuous rib 11 to be a single block, but in the present context where a "block" is defined by transverse cuts, it is preferable to consider rib 11 to be zero "blocks". In particular, the presence of two circumferential continuous ribs 11 disposed symmetrically of the equatorial plane X—X is preferably provided, said ribs preferably being mutually separated by a center groove 12 having substantially the same width as the individual ribs 11. Obviously, in larger tires as the axial width of the tire increases, there may be also an increase in the number of said ribs, although preferably said number would not be higher than three.

Externally of each rib 11, that is moving axially away in each direction from the equatorial plane X—X, there is an inner central row 3, an outer central row 4, an inner shoulder row 5 and an outer shoulder row 6, said rows being adjacently disposed in consecutively side by side relation.

Each of said rows 3, 4, 5, 6 has first transverse cuts 8 each of which, advantageously, is a continuation of one of the first transverse cuts 8 belonging to the adjacent row or rows of shaped blocks which is adjacent in side by side relation therewith.

Practically, the first transverse cuts 8 as a whole define continuous transverse grooves 13 each extending from the corresponding outer side edge 1*a* of the tread 1 to an axial inward position close to the equatorial plane X—X and more particularly close to one of the circumferential ribs 11. This construction advantageously enables the width of the longitudinal grooves to be limited to increase traction of the tire. This is because the water draining action during running on a wet road bed relies on the transverse grooves 13 which act as extensions which are substantially devoid of interruptions thus allowing the water to easily flow towards the outer side edges of the tread 1.

In this connection, as can be seen from FIG. 1, the longitudinal grooves 2 have a smaller width than the first transverse cuts 8 and the transverse grooves 13 which are generated by the transverse cuts 8. In greater detail the ratio between the width "1" of the longitudinal grooves 2 and the width "L" of the first transverse cuts 8 is between 0.2 to 0.6 and preferably is about 0.4.

In addition, each of the transverse grooves 13 starting from the corresponding side edge 1*a* preferably should have one substantially straight portion substantially perpendicular to the longitudinal grooves 2 and extending close to the respective shoulder rows 5, 6, one curved union portion extending close to the outer central row 4 and a second straight portion disposed obliquely of the longitudinal grooves 2 and located close to the inner central row 3.

As regards said straight portion, in its axially outermost section, that is the axial outer section extending towards the tire sidewall, may lie at an inclination greater than 90° relative to the equatorial plane of the tire, this inclination preferably should not be higher than 105°.

In conclusion, due to the arrangement of the transverse grooves 13, in each block row 3, 4, 5, 6 the transverse cuts 8 form with the adjacent longitudinal grooves 2, an impact angle "α" the amplitude of which is greater than that of the impact angle formed with the transverse cuts 8 of the block row disposed consecutively in side by side relation towards the equatorial plane X—X.

In other words, the impact angle "α" of the blocks 7 present in the different rows 3, 4, 5, 6 gradually increases from the equatorial plane X—X towards the outer side edges 1*a* of the tread.

In more detail, the value of the impact angle "α" in the inner central rows 3 closest to the equatorial plane X—X is preferably in the range of 15° to 25°, whereas the value of the impact angle "α" in the outer shoulder rows 6 closest to the side edges 1*a* of the tread 1 is preferable in the range of 70° to 105°.

In the embodiment shown, the value of the impact angle α gradually increases moving away from the equatorial plane X—X, from 20° at the inner center rows 3, to 90° at the outer 6 and inner 5 shoulder rows.

In addition one or more of the block rows, (in the embodiment shown the outer 6 and inner 5 shoulder rows) preferably are provided with second transverse cuts 9 each of them being intermediate between the first cuts contiguous thereto and spaced apart a varying distance therefrom.

This varying distance enables suitable pitch sequences, which are as much as possible uneven (not regularly spaced), to be defined on the tread, for the purpose of reducing the tire noise to the greatest degree, as previously stated.

Preferably the second transverse cuts 9 have a smaller width "L'" than the first cuts 8. More particularly, the ratio between the width of the second cuts 9 and the width of the first cuts 8 is in the range of 50% to 100%, and preferably is about 70%.

The presence of the second transverse cuts 9 in the shoulder rows 5, 6, doubles the number of blocks 7, 7*a*, 7*b* defined therein by the first cuts 8.

In this connection it is apparent that the ratio between the number of block in two side by side block rows varies on varying of the number of the additional cuts (second transverse cuts 9) intermediate between the main cuts (first transverse cuts 8), so that said ratio can be made different than the above-mentioned doubling, if convenient, by increasing or decreasing the number of said additional cuts, even in a different manner, between the different pairs of main cuts.

Transverse slots 9*a* project out as an extension of the second cuts 9 in the blocks 7 belonging to the adjacent rows (in the case shown the outer center rows 4) towards the equatorial plane X—X, according to a portion of lower width than that of the corresponding blocks 7.

In greater detail, each of the transverse slots 9*a* projects out for about half the axial width of the respective block 7, as an extension substantially parallel to that of the first cuts 8 which define the block itself.

The presence of the transverse cuts 9*a* in the blocks 7 belonging to the outer center rows 4 of course causes the number of blocks present in said rows to be increased, so as to insure good operation of the tires, so as to achieve a balance between the number of blocks generated in the outer center rows 4 by the presence of the first cuts 8 and the number of blocks generated in the inner shoulder rows 5 by the presence of the first and second cuts 8 and 9.

One or more of the block rows, in the case shown the outer shoulder rows 6, are also provided with third transverse cuts 10 extending parallel to the first and second transverse cuts 8, 9 at a suitably spaced apart position therefrom. The presence of the third cuts 10 in each outer shoulder row 6 substantially doubles the number of blocks 7*a*, 7*b* already defined therein by the presence of the first and second cuts 8, 9.

In particular, it has been ascertained that in order to have important and considerable advantages in a tread in accordance with the invention, the number of blocks present in the inner center row 3 must preferably be between 40 blocks maximum and 20 blocks minimum around the circumference of the tire.

As can be seen from FIG. 1, the path of the longitudinal groove 2 intermediate between each of the outer 6 and inner 5 shoulder rows is interrupted according to an alternating sequence, at the end of each of the third cuts 10. Therefore, each of the outer shoulder rows 6 has linked blocks 7a formed of a one piece construction with the blocks 7 belonging to the adjacent inner shoulder row 5 alternating with free blocks 7b which are at least partly disengaged from the blocks 7.

The third transverse cuts 10 preferably have a width L" which is smaller than that of the first and second transverse cuts 8, 9. In a preferential embodiment, each of the third cuts 10 along its axial extension has an inner portion 10a projecting through the equatorial plane X—X the width of which is preferably lower than 1 mm and an outer portion, the width of which is greater than that of the inner portion 10a.

In a known manner, the first, second and third transverse cuts 8, 9, 10 are also distributed in such a manner that the blocks 7 defined on the circumferential extension of the tread 1 have differentiated sizes alternating in a predetermined sequence, usually referred to as "stepped sequence", so that the acoustic energy produced by the tire rolling on the road bed is distributed over a wide frequency range.

As previously stated, the distribution of the above described first, second and third transverse cuts 8, 9, 10 is such that it enables the number of the blocks 7 associated with the individual center rows 3, 4 and shoulder rows 5, 6 to gradually increase as one moves axially away from the equatorial plane X—X towards the side edges 1a of the tread 1.

Figure 3:
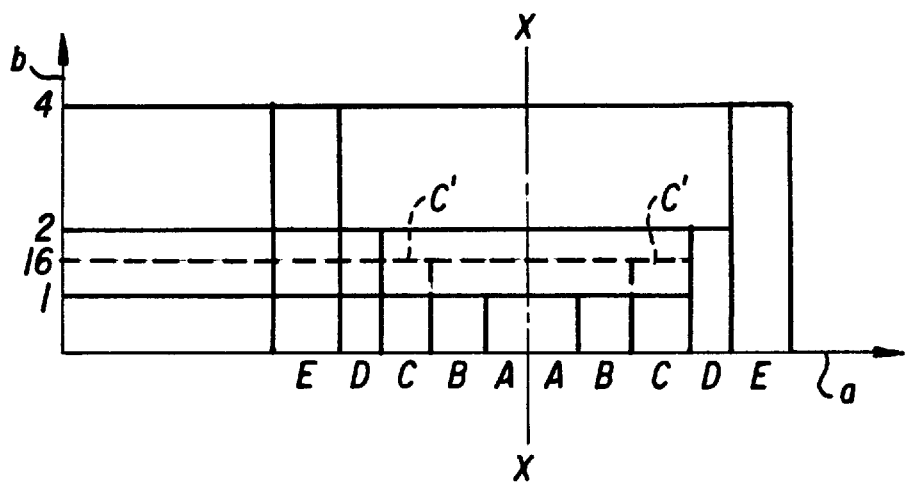
FIG. 3 is a diagram showing the variation in the number of shaped blocks provided in the different circumferential rows disposed consecutively in side by side relation along the transverse extension of the tread.

FIG. 3 graphically shows the variation in the number of blocks 7 in the different rows 3, 4, 5, 6 defined on the tread width. In FIG. 3, the lines denoted by A, B, C, D, E on the abscissa axis "a" correspond to width portions of the tread 1 comprised of the circumferential ribs 11, the inner center rows 3, outer center rows 4, inner shoulder rows 5 and outer shoulder rows 6. Numerically reproduced on the ordinate axis "b" are the number of blocks arranged in the individual areas A, B, C, D, E, in relation to the number of the blocks provided in the inner center rows 3 corresponding to areas B.

The chain lines C' refers to areas C to show the number of blocks 7 present in the outer center rows 4 by the effect of the first cuts 8 and slots 9a.

Figure 2:
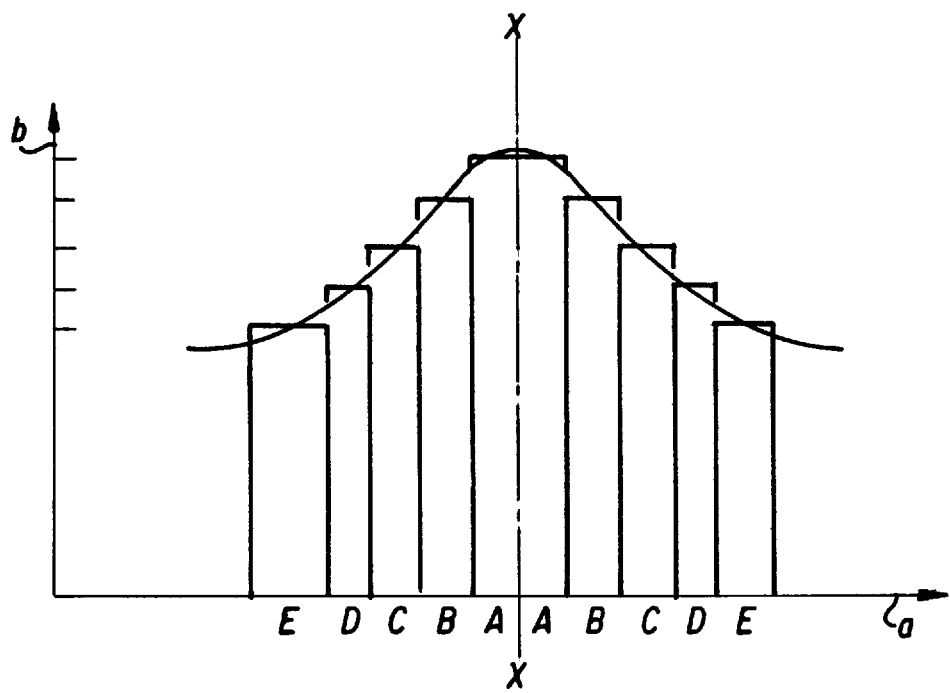
FIG. 2 is a graph showing the variation in the longitudinal stiffness of the tread of FIG. 1 at different points along its transverse extension.

Advantageously, on varying the number of blocks from one row to the other, the longitudinal stiffness present at corresponding areas of the tread width varies correspondingly. As the graph in FIG. 2 clarifies, such a longitudinal stiffness gradually increases from the axial outer side edges 1a of the tread 1 towards the equatorial plane X—X, with its maximum value being reached at the circumferential ribs 11.

In accordance with the invention, such a variation of the longitudinal stiffness has been found to enable the rolling noise produced by the tire with which the tread 1 is associated to be greatly reduced as compared with the known art, reference being particularly made to the noise transmitted to the outside of the motor vehicle.

In this connection it has been found that the tread areas that are most liable to produce the outer noise are those closest to the equatorial plane X—X. In particular, at said areas the noise produced by rolling is particularly enhanced by rubbings and deformations undergone by the blocks during the transitory steps of contacts and separations with and from the road bed at the contact patch.

For a better explanation of why rubbings tend to be greater at the inner areas of the tread, the following considerations should be noted.

One of the factors determining the importance of the rubbings undergone by the blocks is their contact pressure at the contact patch.

It has been found that above all in the exit area from the contact patch, where the separation of the blocks from the road occurs, the contact pressure exerted by the blocks disposed close to the equatorial plane is much lower than that detectable in the blocks close to the outer edges 1a of the tread 1. Therefore, the blocks 7 disposed close to the center areas will tend to undergo stronger rubbings than those close to the side edges 1a of the tread 1.

Another contributory factor in generating rubbings is represented by the acceleration undergone by the blocks 7 during the contact and separation steps with and from the contact patch. As the value of such accelerations is a function of the square of the radius according to which the blocks 7 are distributed about the tire axis, the blocks closer to the equatorial plane X—X are those that undergo the greatest acceleration because the tread 1, as known, has a convex outer profile as viewed in cross-section.

By virtue of the invention therefore it is possible to obviate the greater tendency to rubbing exhibited by the blocks 7 disposed in the areas close to the equatorial plane X—X by giving said blocks a greater longitudinal stiffness resulting from the bigger sizes of the latter, which in turn directly result from the smaller amount of blocks distributed over the circumferential extension of the tread in the center rows 3, 4.

It is to be advantageously noted that the smaller number of blocks in the center areas of the tread 1 does not greatly impair the traction of the tire. Traction in fact mostly relies on the great number of blocks 7, 7a, 7b arranged in the shoulder rows 5, 6 where the greatest contact pressure and smallest tendency to rubbing are found.

Also the variation in the inclination of the transverse cuts 8 is advantageous for the purpose of reducing the outer rolling noise without jeopardizing the traction. In fact, the reduced angle "α" formed with the cuts 8 and longitudinal grooves 2 close to the center rows 3, 4 greatly smooths the impact of the blocks 7 onto the ground, exactly at the areas on which the outer noise most depends. To the contrary, the cuts 8 take an orientation perpendicular to the longitudinal grooves 2 and therefore to the running direction at the areas close to the side edges where the outer noise effects are felt the least and the traction is of great importance.

Obviously, many modifications and variations may be made to the invention as above described, all of them falling within the scope of the invention as defined by the attached claims.

In particular, the tread pattern shown in FIG. 1, referring particularly to the transverse grooves, is symmetric but said tread may also have an asymmetric pattern or a pattern showing mirror images on the two sides of the equatorial plane X—X.

Obviously in manufacturing the tread of the invention the possibility of adopting other expedients already provided by the known art for reducing the rolling noise is not excluded.

We claim:

1. A tire for motor-vehicle wheels provided with a tread producing a low rolling noise, comprising:
    a raised pattern formed of a plurality of shaped blocks (7, 7a, 7b) distributed in parallel circumferential rows (3, 4, 5, 6) bounded by longitudinal grooves (2) extending circumferentially of the tire, the parallel circumferential rows (3, 4, 5, 6) comprising inner central rows (3), inner shoulder rows (5) and outer shoulder rows (6), the outer shoulder rows (6) being adjacent to respective side edges of the tire,
    each row comprising a plurality of shaped blocks circumferentially separated from each other by respective transverse cuts (8, 9, 9a, 10), in which each of said rows has first transverse cuts (8) each of which are in alignment with a respective one of the first transverse cuts of an adjacent block row to define continuous transverse grooves (13) each extending from an outer side edge of the tread to a position adjacent an equatorial plane of the tire, wherein each of said transverse grooves (13) comprises a first portion extending from one of the axial outer side edges of the tread and extending between blocks of an outer shoulder row (6), and a second portion disposed obliquely of the longitudinal grooves (2) and located between blocks of an inner central row (3), and one curved union portion between the first and second portions, wherein in each row of said shaped blocks said first transverse cuts (8) define an impact angle (α) with the respective longitudinal grooves, the value of the impact angle (α) in the rows (6) of blocks closest to each of the axial outer side edges of the tread is in the range of 70° to 105°, and said inner central rows have a number of shaped blocks which is lower than the number of shaped blocks provided in the outer shoulder rows, wherein at least one continuous circumferential rib (11) is disposed close to the equatorial plane, said rib being defined by two of said longitudinal grooves (2), wherein said longitudinal grooves (2) have a smaller width than the first transverse cuts (8), wherein the first portion of said continuous transverse grooves and the second portion of said continuous transverse grooves are straight.

2. A tire according to claim 1, wherein the number of said rows of blocks (7, 7a, 7b) on each axial side of a center line (X—X) of the tread is not smaller than three and not greater than five.

3. A tire according to claim 1, wherein there are two of said circumferential ribs (11) disposed symmetrically with respect to an equatorial plane (X—X) of the tread and mutually separated by a central groove (12).

4. A tire according to claim 1, wherein the inner central rows are the axially innermost rows and the number of said shaped blocks in the respective axially innermost row is in the range of 20 to 40.

5. A tire according to claim 1, wherein the number of said shaped blocks in one row is double the number of shaped blocks in an axially inner adjacent row.

6. A tire according to claim 1, wherein in each row of said shaped blocks, the value of each said impact angle (α) being greater than the value of the impact angle (α) defined by the first transverse cuts of the adjacent row of blocks disposed axially inward thereof towards the equatorial plane of the tire.

7. A tire according to claim 6, wherein the inner central rows are closest to the equatorial plane and the value of the impact angle (α) in the inner central rows is in the range of 15° to 25°.

8. A tire according to claim 6, wherein the outer shoulder rows are closest to each of the axial outer side edges of the tread and the value of the impact angle (α) in the outer shoulder rows (6) of blocks closest to each of the axial outer side edges of the tread is substantially 90°.

9. A tire according to claim 1, wherein a ratio between a width of the longitudinal grooves and a width of the first transverse cuts ranges between 0.6 and 0.2.

10. A tire according to claim 1, wherein at least one of said rows (5, 6) of blocks has second transverse cuts (9) each being intermediate between two of said first cuts (8) and separate from said two of said first cuts (8) and having a smaller width than the first cuts (8).

11. A tire according to claim 10, wherein the second transverse cuts (9) are associated with outer shoulder rows (6), adjacent to the outer side edges of the tread, and inner shoulder rows (5) disposed adjacent to the outer shoulder rows (6) towards an equatorial plane (X—X).

12. A tire according to claim 10, wherein a ratio between a width of the second cuts and a width of the first cuts ranges between 0.5 and 1.

13. A tire according to claim 10, wherein the shaped blocks of at least one of said rows each have at least one transverse slot (9a) extending towards an equatorial plane (X—X) over a portion of a smaller width than the width of that block.

14. A tire according to claim 13, wherein said transverse slots (9a) are associated with outer center rows (4) disposed adjacent the inner shoulder rows (5) towards the equatorial plane of the tire.

15. A tire according to claim 10, wherein at least one (6) of said rows of blocks further comprises third transverse cuts (10) extending parallel to said first and second transverse cuts (8, 9), said third cuts (10) having a smaller width than said first and second transverse cuts.

16. A tire according to claim 15, wherein said third transverse cuts are associated with outer shoulder rows (6) adjacent to the outer side edges of the tread.

17. A tire according to claim 1, wherein each of said rows of blocks has a number of shaped blocks which is greater than the number of shaped blocks present in an adjacent axially inner row towards the equatorial plane of the tire.

18. A tire according to claim 1, wherein said pattern is a non-directional pattern.

* * * * *